US008706893B2

(12) United States Patent
Even et al.

(10) Patent No.: US 8,706,893 B2
(45) Date of Patent: Apr. 22, 2014

(54) MULTIMEDIA COMMUNICATION CONTROL UNIT AS A SECURE DEVICE FOR MULTIMEDIA COMMUNICATION BETWEEN LAN USERS AND OTHER NETWORK USERS

(75) Inventors: Roni Even, Tel Aviv (IL); Uri Rabinerzon, Marietta, GA (US)

(73) Assignee: Polycom Israel, Ltd. (IL)

( * ) Notice: Subject to any disclaimer, the term of this patent is extended or adjusted under 35 U.S.C. 154(b) by 2261 days.

(21) Appl. No.: 10/362,382

(22) PCT Filed: Aug. 14, 2001

(86) PCT No.: PCT/IL01/00756
§ 371 (c)(1),
(2), (4) Date: Oct. 6, 2003

(87) PCT Pub. No.: WO02/15463
PCT Pub. Date: Feb. 21, 2002

(65) Prior Publication Data
US 2004/0114612 A1    Jun. 17, 2004

Related U.S. Application Data

(60) Provisional application No. 60/225,331, filed on Aug. 15, 2000.

(51) Int. Cl.
*G06F 15/16*    (2006.01)
*H04L 29/06*    (2006.01)

(52) U.S. Cl.
CPC .............................. *H04L 29/06027* (2013.01)
USPC ........... 709/231; 709/200; 709/201; 709/202; 709/203; 709/217; 709/218; 709/219; 709/220; 709/221; 709/222; 709/223; 709/224; 709/225; 709/226; 709/230; 709/232; 709/238; 709/239; 709/240; 709/241; 709/242; 709/243; 709/244; 709/245; 370/400; 370/401; 370/389; 370/397; 370/244; 370/248; 370/250; 370/465; 370/522; 370/261; 370/469; 370/395.52; 370/356; 370/391; 370/474; 370/352; 370/524; 370/354; 370/467; 370/410; 370/353; 713/150; 713/152

(58) Field of Classification Search
USPC ......... 709/200, 201, 202, 203, 217, 218, 219, 709/220, 221, 222, 223, 224, 225, 226, 230, 709/232, 238, 239, 240, 241, 242, 243, 244, 709/245; 370/465, 522, 261, 469, 395.52, 370/356, 391, 474, 352, 524, 354, 401, 467, 370/410, 353, 400, 389, 397, 244, 248, 370/250; 713/201, 150, 200, 152
See application file for complete search history.

(56) References Cited

U.S. PATENT DOCUMENTS

| | | | | |
|---|---|---|---|---|
| 5,260,793 A * | 11/1993 | Citta et al. | | 348/607 |
| 5,307,342 A * | 4/1994 | Georgiou et al. | | 370/380 |
| 5,604,867 A * | 2/1997 | Harwood | | 709/233 |
| 5,655,140 A * | 8/1997 | Haddock | | 709/246 |
| 5,999,979 A * | 12/1999 | Vellanki et al. | | 709/232 |
| 6,078,961 A | 6/2000 | Mourad et al. | | 709/235 |
| 6,094,684 A * | 7/2000 | Pallmann | | 709/227 |
| 6,115,356 A * | 9/2000 | Kalkunte et al. | | 370/229 |
| 6,128,653 A * | 10/2000 | del Val et al. | | 709/219 |
| 6,192,422 B1 * | 2/2001 | Daines et al. | | 710/29 |
| 6,202,081 B1 * | 3/2001 | Naudus | | 709/200 |
| 6,256,687 B1 * | 7/2001 | Ellis et al. | | 710/71 |
| 6,295,276 B1 * | 9/2001 | Datta et al. | | 370/218 |
| 6,347,334 B1 * | 2/2002 | Fredericks et al. | | 709/220 |
| 6,353,332 B1 * | 3/2002 | Brelet | | 326/40 |
| 6,421,674 B1 * | 7/2002 | Yoakum et al. | | 1/1 |
| 6,496,216 B2 | 12/2002 | Feder et al. | | 348/14.09 |
| 6,597,689 B1 * | 7/2003 | Chiu et al. | | 370/354 |
| 6,633,985 B2 * | 10/2003 | Drell | | 726/11 |
| 6,636,908 B1 * | 10/2003 | Winokur et al. | | 710/29 |
| 6,671,263 B1 * | 12/2003 | Potter et al. | | 370/261 |
| 6,711,171 B1 * | 3/2004 | Dobbins et al. | | 370/400 |
| 6,754,713 B1 * | 6/2004 | Dascalu | | 709/229 |
| 6,757,005 B1 | 6/2004 | Elbaz et al. | | 348/14.09 |
| 6,779,039 B1 * | 8/2004 | Bommareddy et al. | | 709/238 |
| 6,937,612 B1 * | 8/2005 | Mauger et al. | | 370/465 |
| 7,003,795 B2 * | 2/2006 | Allen | | 725/105 |
| 7,039,922 B1 * | 5/2006 | Shah et al. | | 719/326 |
| 7,146,410 B1 * | 12/2006 | Akman | | 709/220 |
| 7,239,629 B1 * | 7/2007 | Olshansky et al. | | 370/353 |
| 7,286,502 B1 * | 10/2007 | Rao et al. | | 370/328 |

| | | | |
|---|---|---|---|
| 7,441,270 B1 * | 10/2008 | Edwards et al. | 726/15 |
| 2001/0056549 A1 * | 12/2001 | Pinault et al. | 713/201 |
| 2002/0120760 A1 * | 8/2002 | Kimchi et al. | 709/230 |
| 2004/0088574 A1 * | 5/2004 | Walter et al. | 713/201 |

FOREIGN PATENT DOCUMENTS

| | | | |
|---|---|---|---|
| WO | WO 97/28628 | 8/1997 | H04L 12/56 |
| WO | WO 97/40610 | 10/1997 | H04L 29/06 |

OTHER PUBLICATIONS

European search report received in corresponding Application No. EP 01 95 8354 dated Aug. 8, 2005.

Christoph Rensing et al., "*VDMFA, eine verteilte dynamische Firewallarchitectur fuer Multimedia-Dienste,*" Tu Darmstadt, Mar. 31, 1999.

Lodin S. W. et al., "*Firewalls Fend Off Invasions from the Net,*" IEE Spectrum, vol. 35, No. 2, Feb. 1998, pp. 26-34.

Carolyn Duffy Marsan, "Veteran Protocol Lands New Role as Multimedia Star," Network World, Sep. 1999, pp. 7, 120; Carolyn Duffy Marsan, "How Sock Fits," Network World, Sep. 1999, pp. 120.

Carolyn Duffy Marsan, "How Sock Fits," Network World, Sep. 1999, pp. 120.

\* cited by examiner

*Primary Examiner* — Saket K Daftuar

(74) *Attorney, Agent, or Firm* — Wong, Cabello, Lutsch, Rutherford & Brucculeri, L.L.P.

(57) ABSTRACT

A system and method for providing multimedia communication between a firewall protected, LAN based endpoint and an endpoint that is external to the LAN. A logical port of a multimedia communications control unit is attached to the LAN behind the firewall. Another logical port of the multimedia communications control unit is attached to the external endpoint. Multimedia communication data, consisting of call management data and media data, can be exchanged between the endpoints via the multimedia communications control unit. The multimedia communications control unit allows only multimedia communication data that strictly adheres to a particular communications protocol to pass through. Thus, the security afforded by the firewall is not compromised.

16 Claims, 3 Drawing Sheets

MULTIMEDIA COMMUNICATION CONTROL UNIT AS A SECURE DEVICE FOR MULTIMEDIA COMMUNICATION BETWEEN LAN USERS AND OTHER NETWORK USERS

CROSSREFERENCE TO RELATED APPLICATIONS

This application claims priority benefit from PCT Application PCT/IL01/00756, filed Aug. 14, 2001, which in turn claims priority from U.S. Provisional Patent Application No. 60/225,331, filed Aug. 15, 2000.

TECHNICAL FIELD

This invention relates to the field of secure communications and, more particularly, to secure multimedia communication to and from a LAN using H.323 protocol or similar protocol.

BACKGROUND OF THE INVENTION

The age of the "Jetsons" has arrived. Video conferencing and other multimedia communication is now a common place commodity. With the advent of personal computer based video conferencing capabilities, the capability of multimedia communication between devices housed on local area networks (LAN) is essential. One primary concern today is allowing parties to participate in network based video conferencing without compromising the security of their respective networks.

One way to secure a LAN is by using a firewall. A firewall is a system that protects a LAN that is connected to a public network, such as the Internet, from unauthorized access. One example of a firewall is Firewall-I marketed by Check Point.

FIG. 1 is a system diagram illustrating a typical network configuration. A LAN 110 is shown to include computers 111 with a video camera 112 and/or microphone & speakers 113 connected to each computer 111. These computers 111, such as EP2 115, may participate in a multimedia communication and conferencing session by utilizing a communication protocol such as the H.323 Protocol or the Session Initiation Protocol (SIP). Detailed information regarding H.323 protocol can be found on ITU's site: www.itu.org. SIP is an application-layer control or signaling protocol that operates to create, modify, and terminate sessions with one or more participants. More information about SIP Currently Proposed Std. RFC 2543 or 3261 can be found in www.ietf.org. In addition, the computers 111, such as EP2 115, may enter a multimedia communication and conferencing session with entities located external to the LAN 110 (i.e., located on the Internet), such as EP1 145, through an IP Gateway/router 130.

A multimedia communications session based on the H.323 protocol or a similar protocol, typically includes two major groups of data streams. One group of data streams is a group of call management data streams. The call management data streams include call setup, call control, call tear-down, information, etc. that is used to manage a session. A second group of data streams is a group of call media data streams. The call media data streams include the audio and video data or multimedia data that comprises the information exchanged during the multimedia communications session.

In a typical configuration as depicted in FIG. 1, the call management and call media data streams for a multimedia communications session with an entity external to the LAN will need to travel over communication lines 150 to the firewall 120 and then over communication line 160 to an IP Gateway/router 130 through Internet 140 to EP1 145. Thus, it is apparent that a computer that resides on a firewall protected LAN may need to engage in a multimedia session with a computer external to the LAN.

For security reasons, network managers on IP networks usually want to restrict external access to their networks. Most of the time they will only open TCP ports for Telnet, FTP, and some other common services. To accomplish this, the network managers will configure their IP routers (sometimes referred to as gateways) to filter out access to different ports. These filters are commonly referred to as firewalls. IP security firewalls may be configured in a way that does not allow unauthorized connections.

In order for a broad array of devices to access a firewall-protected network, the network manager must open certain TCP/UDP (User Datagram Protocol) ports required by the accessing device. Part of the call management and call media data streams utilized by most video conferencing equipment utilize dynamic TCP/UDP ports. For these data streams to pass through a firewall, the firewall must be compatible with the H.323, or any other applicable protocol, and open the appropriate TCP/UDP ports that are necessary for a particular session. If this is not performed, the firewall typically will block portions of the multimedia data stream and thus, drop desirable audio/video data.

Another concern is that for each TCP/UDP port that is opened, a potential security breach of the firewall through which adverse parties may exploit the protected network is created. Thus, there is a need in the art for a technique to allow devices on firewall protected networks to communicate with each other without breaching the security of the firewall or without losing important data.

Only a few techniques have been utilized as an attempt to address this need in the art. One such technique is to build an additional separate LAN that is dedicated to audio/video communication. The dedicated LAN hosts only video/audio endpoints (e.g., a terminal on a network capable of two way audio and/or video communication with other endpoints). The dedicated LAN is connected directly to a public network without a firewall. Thus, a multimedia communications session can be entered by a device attached to the dedicated LAN without decreasing the security of the main LAN. This technique is inadequate since it completely eliminates the benefit sought after by having a LAN in the first place—interconnected equipment. The use of a separate network isolates the audio/video equipment and increases the overall cost of the network and network management.

Another technique is to utilize a firewall that supports multimedia communication by being compatible with a communication protocol like H.323 or a similar protocol. This technique allows multimedia communication data streams to pass into and out of the LAN. However, a firewall that is compatible with communication standards such as H.323 or a similar protocol would be complex to create, as well as cost prohibitive. Thus, the use of a customized firewall that supports a complicated communications protocol such as the H.323 protocol is not a viable technique to solve the problems in the art.

Another technique that may be employed is to create "holes" in the firewall enabling the multimedia communications data stream to penetrate through the firewall. For example, the firewall may be configured to allow access to all UDP ports. This approach reduces the security of the LAN, because it opens up more holes in the LAN, which may allow unauthorized use of the LAN.

Therefore, there is a need in the art for a system and method to handle multimedia communications without building a separate LAN for strictly carrying the video/audio communications without a firewall. There is further a need in the art to handle multimedia communications without having to upgrade a conventional firewall to handle the H.323 protocol or similar protocol. It is therefore evident that there is a need in the art to allow LAN connected computers to securely communicate with other computers external to the LAN, without diminishing the security of the LAN.

SUMMARY OF THE INVENTION

The present invention is a system for providing secured multimedia communication between a plurality of endpoints belonging to more than one network. Basically, each endpoint connected to a network is able to make a connection to an endpoint on the LAN using that endpoint's IP address. In addition, the connection may be made in the reverse direction. Once a connection has been established between the endpoints, a multimedia conferencing session may begin. Each endpoint is operative to send multimedia packets via its network and to receive multimedia packets from that network.

The present invention allows video conferencing of an endpoint being hosted on a LAN with endpoints that are located external to the LAN without compromising the security of the LAN. Similar to the existing architecture, there is usually at least one video camera, or video source, and/or a microphone and speakers associated with each endpoint. The video source generates multimedia communication data streams. A typical LAN firewall is not able to support multimedia communications without breaching the security provided by the firewall. The present invention includes a multimedia communication control unit that enables the multimedia communications sessions with a device external to a secured LAN without compromising the security of the LAN. The multimedia communication control unit of the present invention includes a control unit, a common interface, and a plurality of input/output logical ports and, is operative to only allow data that strictly conforms to the supported communications protocol (i.e., the H.323 protocol, SIP) to pass into and out of the LAN. Thus, the security of the LAN is not compromised yet, multimedia communications with a device external to the LAN can be accomplished.

In one embodiment of the present invention, an endpoint located external to a LAN may enter into a multimedia communications session with an endpoint on the LAN by passing all information through the multimedia control unit. The multimedia communication control unit facilitates the connection between the aforementioned endpoints. The external endpoint generates a call management data stream to the LAN based endpoint in an attempt to setup the session. The call management data stream would proceed to the multimedia communication control unit via an input/output ("I/O") logical port. Each I/O logical port has its own IP address for receiving data. Within the multimedia communication control unit the call management and data streams are transferred to a control unit through a common interface. Once the control of the call has been established, the communications between the two endpoints would take a similar route. Thus, the media data streams would also pass through the multimedia communications control unit.

In another embodiment of the present invention, the call management data streams are transferred from an endpoint external to the LAN via a gateway/router and enters the LAN through a firewall, such as firewall 120. The call management data streams are further transferred to the multimedia communications control unit so that the multimedia session can be established. Thus, in this embodiment of the present invention, the call management data streams follow the traditional path, but once the multimedia session is setup with the multimedia communications control unit, the media data streams bypass the firewall and only travel through the multimedia communications control unit.

DETAILED DESCRIPTION OF THE INVENTION

The present invention provides a solution to the above-described needs in the art by providing a method for a LAN connected computer to engage in a multimedia communications session with another computer external to the LAN without compromising the security of the LAN. More specifically, the present invention utilizes a communication control unit that is connected to a firewall protected LAN. The communication control unit allows multimedia communication streams to pass into and out of the LAN to other devices located external to the LAN. However, because the communication control unit will only allow multimedia communication streams that strictly conform to a particular communications protocol, such as the H.323 protocol and SIP, the security of the LAN is not compromised. Thus, data streams can be diverted around the firewall through the communication control unit.

Now turning to the figures where like numerals refer to like elements, various aspects, features and enabling embodiments of the present invention are provided.

Figure 1:
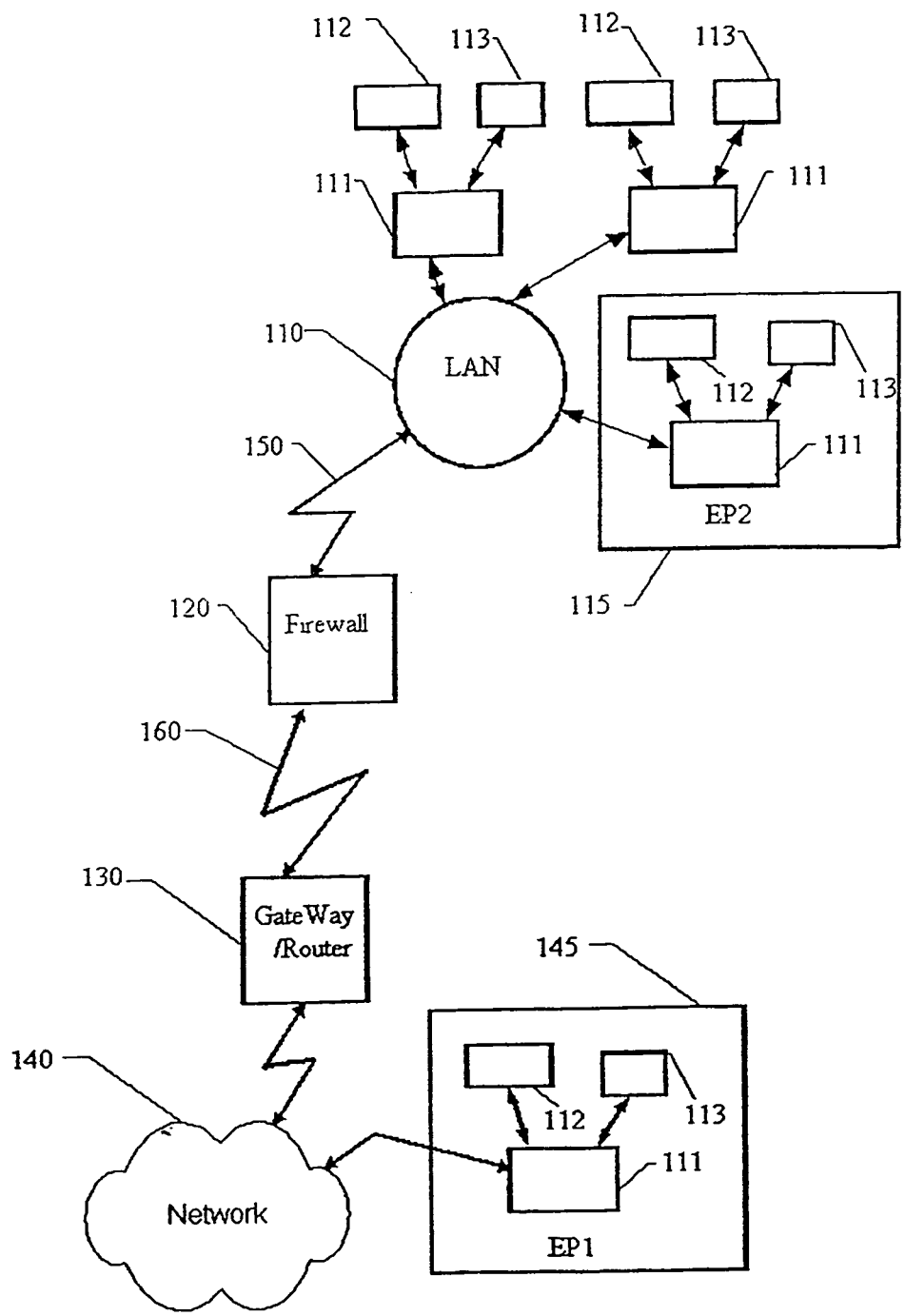
FIG. 1 is a system diagram illustrating a typical network configuration.
Figure 2:
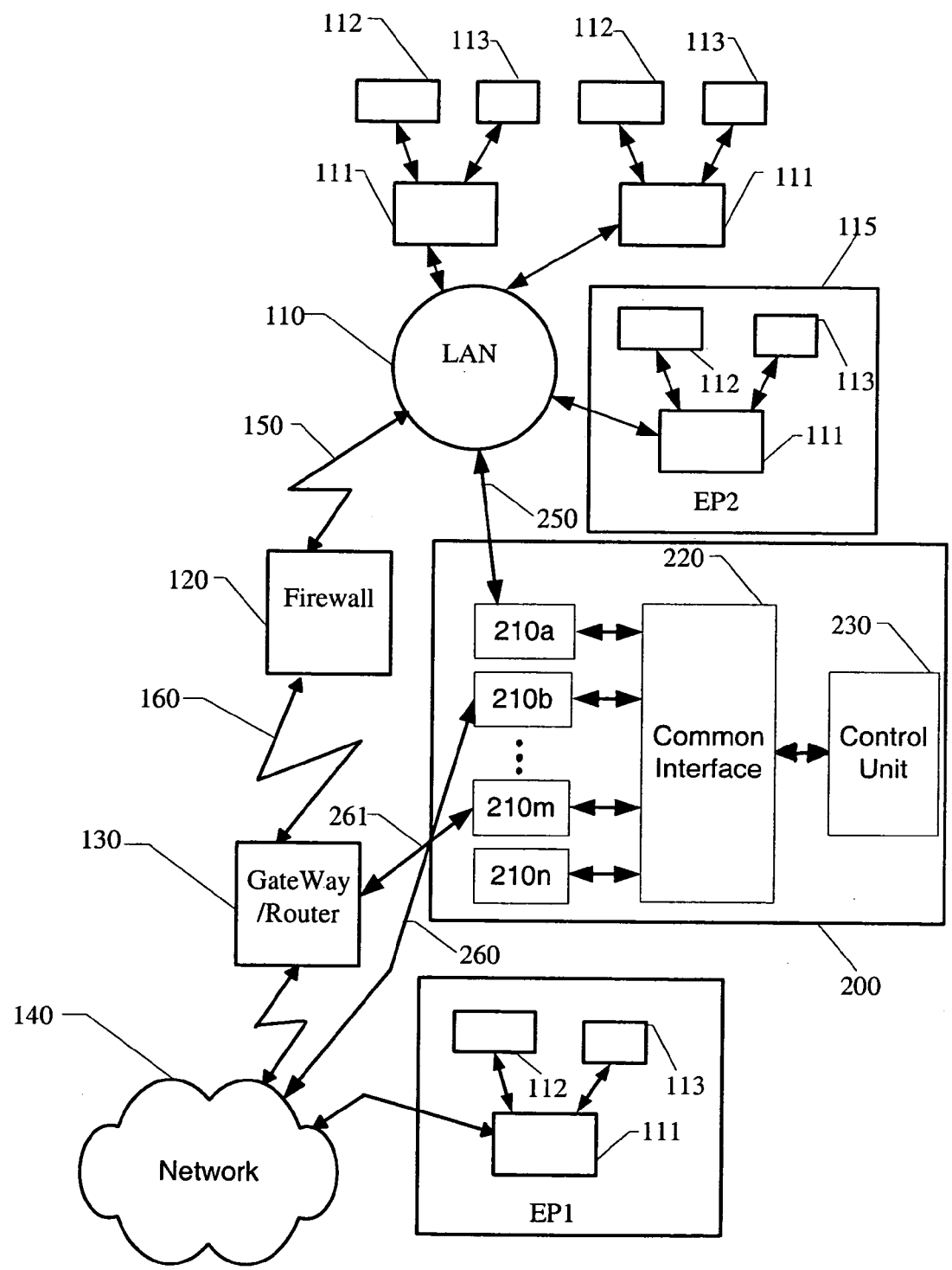
FIG. 2 is a system diagram of an exemplary embodiment of the present invention.

FIG. 2 is a system diagram of an exemplary embodiment of the present invention. In the illustrated embodiment, a multimedia communication control unit 200 is connected to a LAN 110 via a communication line 250, a public network 140 through communication path 260, and a gateway/router 130 through communication path 261. The multimedia communication control unit 200 is a device located in a node of a network that receives several channels from access ports, according to H.323 or a similar protocol. The multimedia communication control unit 200 processes the multimedia signals and distributes them to connected channels. The multimedia communications control unit 200 can be an MCU, a gateway, or any of a variety of other video/communications equipment. In fact, the multimedia communications control unit 200 can be a dedicated device that simply supports the passage of a particular communication protocol, such as H.323 and SIP, and filters all other communications. One example of a multimedia communication control unit is the MCU MGC-100 in H.323 configuration manufactured and marketed by Polycom, Inc.

The multimedia communication control unit 200 includes several input/output logical ports 210a-210n. Each input/output logical ports 210a-210n may serve more than one endpoint, which is connected to a network that the input/output logical port is connected to. Each input/output logical port has a different IP address and can be connected to a network such as a LAN 110 or to a public network 140 using H.323 formatted communications or some similar standard.

For example, the input/output logical port 210a is connected to the LAN 110 and the input/output logical port 210b is connected to the Internet 140.

In an exemplary multimedia communications control unit, all the input/output logical ports 210a-210n are connected to a common interface (CI) 220. The CI 220 operates as a routing unit between the input/output logical ports. The CI 220 can be implemented as a bus (e.g., a TDM bus, a serial bus, an optical bus, an ATM bus, any combination of those buses or the like), through a direct connection, or through another mechanism such as a shared memory. Other techniques to interconnect the input/output ports may also be used, and the specific examples provided are intended only to be illustrative and are not a limitation of the different techniques that may be implemented.

A control unit 230 coordinates the operation of multimedia communication control unit 200 by managing the input/output logical ports 210a-210n, the common interface 220, the call management and the call control of the multimedia communication sessions. Said control unit 230 may include an internal routing table between the different input/output logical ports 210a-210n.

In one exemplary embodiment of the present invention, the multimedia communications control unit operates as the path for the call management and call media data streams. Although the data exchanged is described as streams, it should be understood that the stream may include compressed multimedia packets, packet switched data, circuit switched data and other transmission techniques. In this embodiment, the call management streams and the media streams are sent from a source endpoint to a destination endpoint through the multimedia communications control unit. For example, a first endpoint (EP1) 145 connected to a public network 140 may enter a multimedia communications session with a second endpoint (EP2) 115 connected to a LAN 110. In this scenario, the data streams will flow from the first endpoint 145, through the public network 140 and to an input/output port 210b of the multimedia communications control unit 200 via communication path 260. The data streams that conform to the appropriate protocol will be sent out of the multimedia communications control unit 200 via CI 220 through an input output port 210a. Finally the data stream will arrive at the second endpoint 115 connected to the LAN 110.

In another embodiment of the present invention, the firewall 120 is part of the path of the call setup from the external EP1 145. For example, the first endpoint 145 connected to the public network 140 may enter into a multimedia communications session with the second endpoint 115 connected to the LAN 110. In this example, the call setup data stream, which typically does not require the use of dynamic TCP/UDP ports, will flow from the first endpoint 145 through the public network 140 to a gateway/router 130. The call setup data stream will then be communicated to the firewall 120 controlling access to the LAN 110 through communication path 160. The call management data stream is passed to the LAN 110 via communication path 150. Finally, the call setup data stream is routed to the multimedia communication control unit 200 to the input/output port 210a.

The rest of the call management streams, e.g. call control, and the media stream are transmitted from network 140 over communication path 260 through input/output port 210b.

The advantage of this case is that the media stream is routed through the multimedia communications control unit 200 while the call setup stream is authenticated by the firewall 120 before being routed to multimedia communications control unit 200. In both of these embodiments, inside the multimedia communications control unit 200, the call management data streams (e.g., H.245) are routed to the control unit 230, which manages the call based on the applicable protocol.

The following are illustrative flow examples of an exemplary embodiment of the present invention.

Call flow 1.

In this example, the multimedia communications control unit 200 has a physical connection 261 via the gateway/router 130 to a DMZ and a physical connection 250 to a protected zone. The DMZ is a mnemonic for a demilitarized zone, and in this context, means a connection that is external to the firewall 120 and connected to an external network. The protected zone is an area that connects to the LAN.

In this example, the multimedia communications control unit 200 has a physical connection 261 via the gateway/router 130 to a DMZ and a physical connection 250 to a protected zone. The DMZ is a mnemonic for a demilitarized zone, and in this context, means a connection that is external to the firewall 120 and connected to an external network. The protected zone is an area that connects to the LAN 110 via the firewall 120 and is protected by the firewall 120.

The external connection 261 is used for call management and for media transport coming from the external network via gateway/router 130. The endpoint EP1 145, which is connected in the external network 140, calls the endpoint EP2 115, which is connected to the internal network 110.

The call signaling address of the multimedia communications control unit 200 is configured in the gateway/router 130 to go directly to the multimedia communications control unit 200 via connection 261.

Endpoint EP1 145 calls the multimedia communications control unit 200 and gives the alias address of endpoint EP2 115 as the final address. The router 130 receives the call management and routes the call via communication line 261 to multimedia communications control unit 200, which establishes the call on both sides. All connections to endpoint EP1 145 are handled via gateway/router 130, connection 261 and I/O module 210m. All connections to endpoint EP2 115 are handled via connection 250 and the input/output logical port 210a.

Call flow 2.

In this example, similar to call flow 1, the multimedia communications control unit 200 also has a physical connection 261 to the gateway/router 130, which is connected to the DMZ, and a physical connection 250 to the protected zone. In contrast to call flow 1, the call setup address of the multimedia communications control unit 200 is configured in the router 130 to go to the firewall 120 via line 160. The firewall 120 is configured to allow the call setup stream to go to the call setup ports of the multimedia communications control unit 200 and to the input/output logical port 210a. This port may be an application protocol of the call setup port. The call setup stream continues from the firewall 120 to the LAN 110, and from the LAN 110 to the Multimedia Communication Control Unit 200 via the line 250. This is a different IP address than the address that will be used after the connection is established. After the connection is established new dynamic channels will be open using IP addresses that will cause subsequent communications to be routed by the router 130 directly to the multimedia communications control unit 200 via line 261 and not via the firewall 120 and the LAN 110.

Endpoint EP1 145 calls the endpoint EP2 115 via the call signaling address of the multimedia communications control unit 200 giving the alias address of endpoint EP2 115 as the final destination. The router 130 routes the call management message to the firewall 120 that verifies the source and directs the message via communication lines 150 to the LAN 110 and to the multimedia communications control unit 200 via communication lines 250. The multimedia communications control unit 200 establishes a connection to endpoint EP2 115 on the internal network. After connection establishment, the rest of the channels that need to be opened between endpoint EP1 145 and multimedia communications control unit 200 are made through communication lines 261 and router 130.

When the input/output logical port 210a connected to the LAN 110 recognizes an H.323 or similar communication with the appropriate IP number, for example, from one or more users 111, the input/output logical port 210a reads and processes the video/audio data based on H.323 or similar protocol. The processed video/audio data is transferred to the data routing unit via the common interface 220, and to the appropriate logical input/output logical port 210, for example, 210b, which processes the data and transfers it, using H.323 protocol or a similar protocol, via the Internet 140 to the data's destination.

Communication can be initialized from both directions: from the Internet 140 to the LAN 110, as described above, or vice versa. When the input/output logical port 210b or 210m is connected to the Internet 140 and recognizes an H.323 or similar communication to at least one of the computers 111 on the LAN 110 connected to the input/output logical port 210a, the input/output logical port 210b or 210m reads the communication, processes the video/audio data based on H.323 or a similar protocol, and transfers the processed data via the common interface 220 to the appropriate input/output logical ports 210a. The appropriate input/output logical ports 210a processes the data and transfers it, using H.323 or a similar protocol, via the LAN 110 to its destination (for example, one or more of the computers 111).

Figure 3:
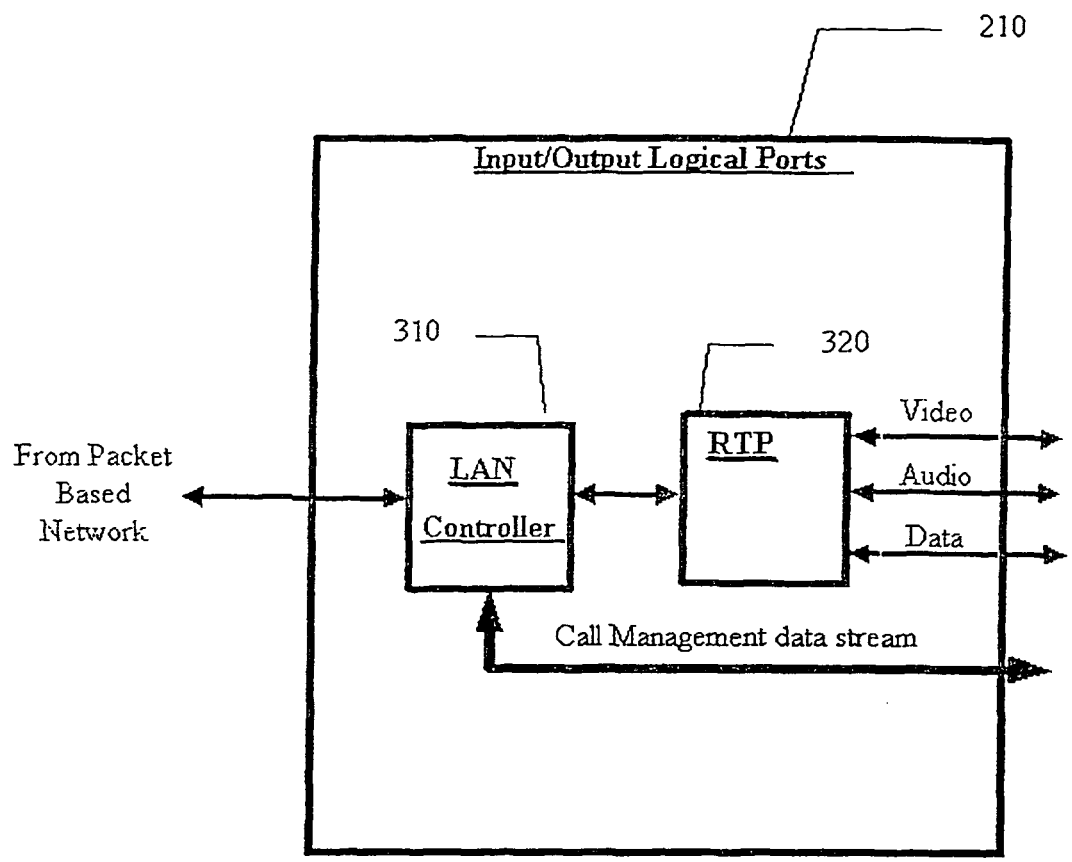
FIG. 3 is a block diagram of an exemplary embodiment of an input/output logical port for a multimedia communications control unit.

FIG. 3 is a block diagram of an exemplary embodiment of an input/output logical port 210. The exemplary input/output logical port 210 comprises a LAN controller 310 connected to a real time processor (RTP) unit 320. The LAN controller 310 receives the packets from the network, processes them according to Ethernet protocol and Internet Protocol, then transfers the stream of packets to the RTP unit 320.

The RTP 320 processes the stream of packets based on the multimedia standards like, but not limited to, H.323 and SIP into three type of streams:
(1) Compressed Audio stream (e.g., G.711: G.729; G.723.1);
(2) Compressed Video stream (e.g., H.261; H.263; MPEG); and
(3) Data: (e.g., T.120).

Those streams are routed to another input/output logical port via a routing unit or common interface 220 (FIG. 2). In case additional functionality is required from the multimedia communications control unit 200 (FIG. 2), there are more internal units added. For example, if the functionality of stream transcoding is needed, a transcoding unit will be added to process the compressed media and translate the incompatible streams. Those additional units are well known in the art and are not in the scope of this invention.

In the opposite direction, the input/output logical port 210 receives the appropriate streams, which are routed to it from another input/output logical port via the common interface 220. The RTP 320 creates a stream of packets according to the application protocol like H.323, SIP, etc, and transfers them to the LAN controller 310. The LAN controller 310 processes them according to the communication standard, and sends the processed packets to the network.

In the new configuration proposed in this invention, at least one input/output logical port, for example 210a (FIG. 2), is dedicate to one LAN 110 and at least one other input/output logical port, for example 210b (FIG. 2), is dedicate to another network such as the Internet 140. Since the multimedia communication control unit 220 has more then two input/output logical ports, it can simultaneously be connected to more then two networks.

The internal process of "depacketizing" and "packetizing" audio/video and data based on H.323 or similar protocol enables a secure communication to a LAN without affecting the firewall, which continues protecting the LAN from unauthorized access. The multimedia communication control unit 200 acts as a firewall to secure the LAN for a multimedia conference by filtering and transferring only information that is using H.323 or similar protocols that are protocols for multimedia conference and will block any other data or commands. It should be noted that in normal operation, a multimedia communication control unit is only connected to a single network; however, in the proposed exemplary invention it is connected to two or more networks.

An exemplary multimedia communication control unit that can be used in this invention generally comprises at least the following:
(a) A multiple input/output logical port architecture with at least two or more input/output logical ports;
(b) Each input/output logical port having a different IP address;
(c) The ability to process H.323 or other functionally similar protocols; and
(d) The ability to block all other protocols from being processed by any input/output logical ports that were selected to support communication such as H.323 or a similar protocol. The input/output logical ports reject any protocol that is not the allowed application protocol. Furthermore, the multimedia communication control unit 200 analyzes every packet including the media data streams and verifies that it is a true protocol packet.

Thus, it may be seen that the present invention advantageously provides secured multimedia communication between a LAN based endpoint that is residing behind a firewall and an endpoint external to the firewall. The existing level of security of the LAN provided by the firewall is not compromised while the multimedia communication control unit processes-media streams. In one of the exemplary embodiments, the external call management streams are transferred and processed by the multimedia communication control unit. The system forces the input/output logical port, which is dedicated to H.323 or a similar communication protocol, to support only H.323 or a similar protocol, and therefore the system isolates the internal LAN from any other protocol. The system is able to handle a greater number of video conferencing calls in comparison to the conventional configuration.

The present invention has been described in relation to particular embodiments which are intended in all respects to be illustrative rather than restrictive. Those skilled in the art will understand that the principles of the present invention may be applied to, and embodied in, hardware, software, or a combination of both, for operation on differing types of devices, regardless of the application.

Alternate embodiments will become apparent to those skilled in the art to which the present invention pertains without departing from its spirit and scope. Accordingly, the scope of the present invention is described by the appended claims and supported by the foregoing description.

What is claimed is:

1. An apparatus for communicating multimedia data streams between a first endpoint communicatively coupled to a secured network, wherein the secured network is secured by a firewall, and a second endpoint external to the secured network, the apparatus comprising:

a first logical port monitoring traffic flow through the apparatus;

a second logical port monitoring traffic flow through the apparatus; and a common interface communicatively coupling the first logical port to the second logical port;

the first logical port being communicatively coupled to the first endpoint, the first endpoint within the secured network;

the first logical port operative to select, from the common interface, a selected multimedia data stream, the selection based on conformance with a first communication protocol from a plurality of data streams received by the first logical port and initiate a transfer of the selected multimedia data streams to the first endpoint, the selected multimedia data streams bypassing the firewall;

the first logical port further operative to receive multimedia data streams conforming to the first communication protocol from the first endpoint and inject them into the common interface;

the second logical port communicatively coupled to the second endpoint and configured to receive input data streams from the second endpoint; and the second logical port operative to select a portion of the input data streams, the selection based on conformance to the first communication protocol and allow only multimedia data streams conforming to the first communication protocol to be injected into the common interface, and, to select multimedia data streams conforming to the first communication protocol from the common interface and initiate transfer of the selected multimedia data streams to the second endpoint, the selected multimedia data streams bypassing the firewall.

2. The apparatus of claim 1, wherein the first logical port and the second logical port each have a unique Internet Protocol address.

3. The apparatus of claim 1, wherein the first communication protocol is H.323.

4. The apparatus of claim 1, wherein the first communication protocol is SIP.

5. An apparatus for communicating multimedia data streams between a first endpoint and a second endpoint, the apparatus communicatively coupled to a first network and a second network, the first endpoint communicatively coupled to the first network, and the second endpoint communicatively coupled to the second network, the first network being secured by a firewall and the second network being a public network, the apparatus comprising:

a first logical port monitoring traffic flow through the apparatus;

a second logical port communicatively coupled to the second endpoint within the public network and monitoring traffic flow through the apparatus; and a common interface communicatively coupling the first logical port to the second logical port;

the first logical port operative to receive call management data streams from said first network and to establish a multimedia communications session between the first endpoint and the second endpoint;

the first logical port further operative to select a media data stream from a plurality of data streams received by the first logical port, the selection based on the media data stream conforming to a first communication protocol;

the first logical port further operative to select the media data stream from the common interface and initiate transfer of the media data stream to the first endpoint;

the first logical port further operative to receive media data streams conforming to the first communication protocol from the first endpoint and inject them into the common interface;

the second logical port communicatively coupled to the second endpoint and operative to receive input data from the second endpoint, select at least a portion of the input data conforming to the first communication protocol and allow only multimedia data streams conforming to the first communication protocol to be injected into the common interface; and the second logical port further operative to select conforming media data streams from the common interface and initiate transfer of the selected conforming media data streams to the second endpoint;

wherein conforming multimedia data streams selected by the first and second logical port via the common interface bypass the firewall.

6. The apparatus of claim 5, wherein the first logical port and the second logical port each have a unique Internet protocol address.

7. The apparatus of claim 5, wherein the first communication protocol is H.323.

8. The apparatus of claim 5, wherein the first communication protocol is SIP.

9. A method for providing multimedia communication data between a first endpoint communicatively coupled to a secure network secured by a firewall and a second endpoint external to the secure network without compromising the security of the secure network, the method comprising the steps of:

communicatively coupling a multimedia communications control unit to a network secured by a firewall and to a public network, thereby bypassing the firewall of the secure network;

receiving, at the multimedia control unit control data from the first endpoint addressed to the second endpoint, the first endpoint communicatively coupled to the secure network and the second endpoint external to the secure network;

if the control data does not conform to a particular protocol, blocking the control data;

if the control data conforms to the particular protocol, processing the control data to establish a multimedia communications session between the first endpoint and the second endpoint; and receiving media data from the second endpoint addressed to the first endpoint;

if the media data does not conform to the particular protocol, blocking the media data; and if the media data conforms to the particular protocol, initiating transfer of the media data to the first endpoint.

10. The method of claim 9, wherein the multimedia communications control unit has a first Internet Protocol (IP) address to be used by the first endpoint and a second IP address to be used by the second endpoint.

11. The method of claim 9, wherein said particular protocol is H.323.

12. The method of claim 9, wherein said particular protocol is SIP.

13. A non-transitory computer readable medium storing instructions thereon to cause a programmable apparatus to communicate multimedia data streams between a first endpoint communicatively coupled to a secured network and a second endpoint external to the secured network, wherein the secured network is secured by a firewall, comprising instructions to cause the programmable apparatus to configure:
- a first logical port for monitoring traffic flow through the apparatus;
- a second logical port for monitoring traffic flow through the apparatus; and
- a common interface communicatively coupling the first logical port to the second logical port;
- the first logical port being communicatively coupled to the first endpoint, the first endpoint within the secured network;
- the first logical port operative to select, from the common interface, a selected first multimedia data stream, the selection based on conformance with a first communication protocol from a plurality of data streams received by the first logical port and initiate a transfer of the selected first multimedia data stream to the first endpoint, the selected first multimedia data stream bypassing the firewall;
- the first logical port further operative to receive multimedia data streams conforming to the first communication protocol from the first endpoint and inject them into the common interface;
- the second logical port communicatively coupled to the second endpoint and configured to receive input data streams from the second endpoint; and
- the second logical port operative to select a portion of the input data streams, the selection based on conformance to the first communication protocol and allow only multimedia data streams conforming to the first communication protocol to be injected into the common interface, and, to select second multimedia data streams conforming to the first communication protocol from the common interface and initiate transfer of the selected second multimedia data streams to the second endpoint, the selected second multimedia data streams bypassing the firewall.

14. The non-transitory computer readable medium of claim 13, wherein the first logical port and the second logical port each have a unique Internet Protocol address.

15. The non-transitory computer readable medium of claim 13, wherein the first communication protocol is H.323.

16. The non-transitory computer readable medium of claim 13, wherein the first communication protocol is SIP.

* * * * *